May 9, 1950 R. F. SIMPSON ET AL 2,506,689

RUBBER SUN VISOR

Filed June 29, 1946

INVENTORS
Robert F. Simpson
Earl H. Schoner
BY

Frease and Bishop
ATTORNEYS

Patented May 9, 1950

2,506,689

UNITED STATES PATENT OFFICE 2,506,689

RUBBER SUN VISOR

Robert F. Simpson, Hartville, and Earl H. Schoner, Uniontown, Ohio, assignors of one-third to Robert J. Himmelright, Hartville, Ohio Application June 29, 1946, Serial No. 680,464

3 Claims. (Cl. 160—354)

The invention relates to sun visors or glare shields and more particularly to the construction of a rubber sun visor for attachment and use adjacent the windshield or windows of an automobile.

Sun visors have been used extensively on automobiles for movement to various adjusted positions to shield or guard the eyes of the driver or other occupant from the direct rays or glare of the sun through the windshield or windows of the vehicle. Ordinarily, such prior sun visors have been constructed of a generally rectangular plywood board covered with fabric and mounted on a universal pivot at one corner of the board and at an upper front corner of the body of the motor vehicle.

It has been found, because of the relative location of sun visors in automobiles with respect to the driver or occupant in close proximity to the head and particularly the eyes and nose of such driver or occupant, that in a high percentage of automobile accidents, the driver or occupant receives extensive and severe injuries in the region of his forehead, eyes or nose.

This condition occurs because when an automobile comes to a sudden stop as a result of a collision, the mounting for prior sun visors may give way and the rectangular board travels with great force edgewise to and strikes the head of the driver or occupant; or the driver or occupant may be thrown forward under similar circumstances and his head strikes the edge of prior wooden board sun visors.

In the interest of safety and in reducing the extent and character of injuries caused as a result of automobile accidents, some solution of this problem has been sought by which the driver or occupant of an automobile could have the benefit of sun visor protection and yet avoid accidental injuries resulting therefrom. No satisfactory answer or solution to this problem has to our knowledge been suggested or made.

Accordingly, it is a general object of the present invention to provide an improved sun visor construction for motor vehicles.

Furthermore, it is an object of the present invention to provide a sun visor construction for motor vehicles which shields the driver or occupant of a motor vehicle from the direct rays or glare of the sun and the like, and which at the same time avoids serious or extensive injuries to the driver or occupant of the vehicle in the event that the vehicle is involved in an accident.

Furthermore, it is an object of the present invention to provide an improved sun visor construction for motor vehicles formed of rubber or other relatively soft, yielding and pliable material which will not seriously injure the head and particularly the eyes and nose of a person upon striking or being struck by such person, edgewise.

Likewise, it is an object of the present invention to provide an improved rubber sun visor construction for motor vehicles having sufficient flexibility, pliability and collapsibility that it will not injure the car occupant, and having sufficient rigidity and stiffness that it will be maintained normally in flat position in any desired adjusted position within the body of a motor vehicle.

Finally, it is an object of the present invention to provide a new rubber sun visor construction for motor vehicles which avoids the prior art difficulties, satisfactorily solves the existing problem in the art, which incorporates the foregoing advantages in a simple and effective manner, and which is inexpensive to manufacture and safe and efficient in use.

These and other objects and advantages apparent to those skilled in the art from the following description and claims may be obtained, the stated results achieved, and the described difficulties overcome, by the devices, constructions, arrangements, combinations, sub-combinations, parts and elements which comprise the present invention, the nature of which is set forth in the following general statement, a preferred embodiment of which—illustrative of the best mode in which applicants have contemplated applying the principles—is set forth in the following description and shown in the drawings, and which are particularly and distinctly pointed out and set forth in the appended claims forming part hereof.

The nature of the improvements in sun visor construction of the present invention may be stated in general terms as preferably including a substantially rectangular, relatively thin, sheet-like visor or glare shield formed of rubber and the like having sufficient pliability, flexibility and resilience to readily collapse upon striking or being struck by a moving object such as the head or other body part of a human being, means formed integrally as by molding within the upper edge of said sheet for attaching such sheet to a universally adjustable mounting bracket on a motor vehicle, and means embedded in the edge portions of and extending around the corners of said rubber sheet for maintaining the same in substantially flat condition in any position of adjustment, said maintaining means having insufficient strength or stiffness to prevent ready collapse of the rubber sheet upon striking or being struck by a moving object.

By way of example, a preferred embodiment of the improved rubber sun visor is illustrated in the accompanying drawings forming part hereof, wherein.

Similar numerals refer to similar parts throughout the various figures of the drawings.

Figure 1:
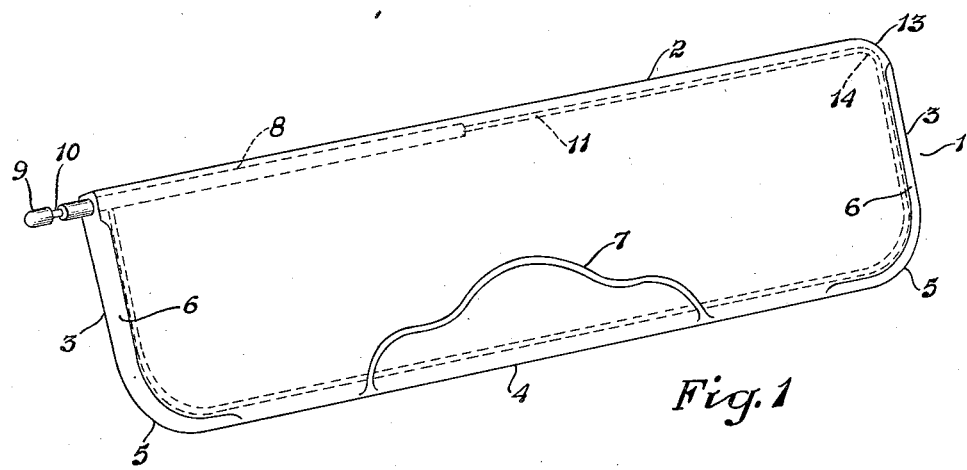
Figure 1 is a perspective view of an improved rubber sun visor constructed in accordance with the present invention.
Figure 2:
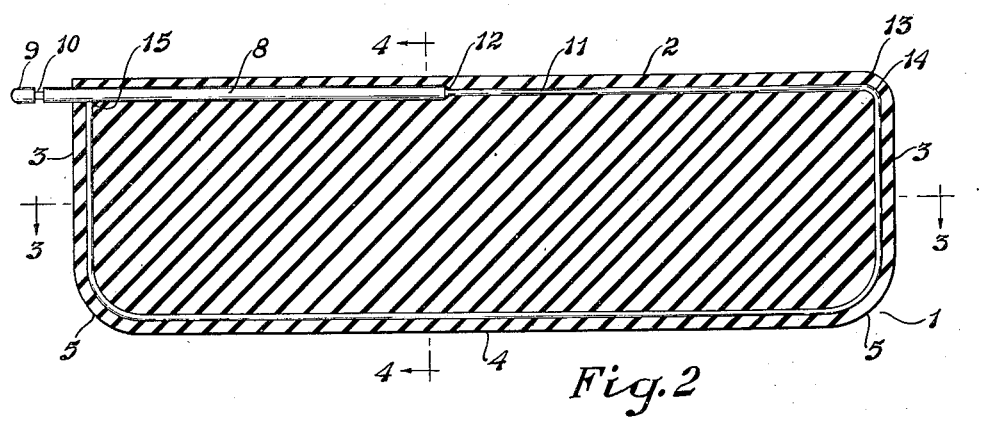
Fig. 2 is a longitudinal section through the rubber sun visor shown in Fig. 1.
Figure 3:
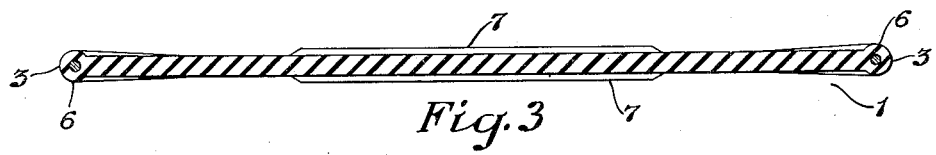
Fig. 3 is a cross section taken on the line 3—3, Fig. 2.
Figure 4:
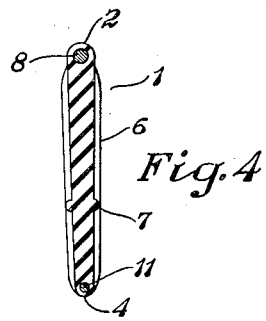
Fig. 4 is a cross section taken on the line 4—4, Fig. 2.

A thin, flat, generally rectangular, preferably molded rubber sun visor sheet is indicated generally at 1 and may be formed of molded rubber of any desired composition and color. The sheet 1 may have a thickened upper edge portion 2, side edge portions 3 and a bottom edge portion 4. The side and bottom edge portions are preferably joined by rounded corners 5 which may be formed as at 6 with any suitably shaped rib for presenting a pleasing appearance. Likewise, the rib 7 may be formed in one or both faces of the generally rectangular sheet 1 for presenting an attractive appearance.

When the thin elongated rectangular sheet 1 is molded, a bar 8 is embedded within a portion of the upper edge 2 of the molded sheet, as shown. The bar 8 preferably projects outwardly at 9 from one upper corner of sheet 1 and may be formed at 10 with a recess or groove. The projection 9, grooved at 10, forms means for attaching the sun visor to any usual and well-known universal pivot bracket for supporting the visor in a motor vehicle; and the bar 8 has a sufficient size to support the weight of the rubber sun visor 1 from the mounting bracket (not shown).

A very small diameter and relatively soft preferably metal rod 11, welded or otherwise secured at 12 to the inner end of the bar 8 is also permanently molded within the sheet 1 extending along the remainder of the upper edge 2 of the visor sheet 1, around the free upper corner 13 thereof as indicated at 14, down one side edge 3, around one bottom corner 5, along the bottom edge 4, around the other bottom corner 5, and upward along the other side edge to the point 15 where it likewise may be secured as by welding to the bar 8. If desired, a section of the rod 11 along the lower edge 4 of the visor sheet 1 between the corners 5 thereof may be omitted. Thus the metal rod 11 has the contour of the edge and corner portions of the rectangular visor sheet 1.

The rod 11 is only large enough in diameter and stiff enough to hold the rubber of the visor sheet in generally flat condition when it is in any normal adjusted position within the motor vehicle and to maintain such substantially flat condition against the normal vibration of the vehicle transmitted to the visor. However, the wire 11 is not stiff or strong enough to prevent ready collapse, particularly edgewise, of the visor sheet 1 if the visor breaks loose and flies edgewise against and strikes an occupant of the vehicle as an incident to an automobile accident, or similarly if a vehicle occupant is thrown toward the visor so as to strike the visor, particularly edgewise.

The improved rubber sun visor construction thus prevents any severe or substantial injury to an automobile occupant upon striking or being struck by such occupant and therefore prevents severe head injuries such as eye injuries or broken nose bones which frequently occur as a result of the present plywood board construction of sun visors.

Likewise, the improved sun visor construction can be molded in any desired color so as to match the remaining upholstery or trim color arrangement or combination in a motor vehicle, without requiring any fabric covering thereon.

Furthermore, the present improved sun visor construction provides a motor vehicle sun visor which accomplishes all of the purposes enumerated above, solves problems existing in the art, and prevents injuries which occur in a high percentage of automobile accidents.

In the foregoing description, certain terms have been used for brevity, clearness and understanding; but no unnecessary limitations are to be implied therefrom beyond the requirements of the prior art, because such words are utilized for descriptive purposes herein and not for the purposes of limitation, and are intended to be broadly construed.

Moreover, the embodiments of the improved construction illustrated and described are by way of example, and the scope of the present invention is not limited to the exact details of construction of the various parts shown.

Having now described the features of the invention, the manufacture of a preferred embodiment of improved rubber sun visor, and the advantageous, new and useful results attained and the existing problem in the art solved thereby; the new and useful devices, constructions, arrangements, combinations, sub-combinations, parts and elements, and reasonable mechanical equivalents thereof, obvious to those skilled in the art, are set forth in the appended claims.

We claim:

1. In sun visor construction adapted for universal adjustable mounting within a vehicle, a relatively thin, generally rectangular, visor sheet formed of molded rubber, a bar molded integrally within a portion of the upper edge of the sheet having an end portion projecting from one corner of said sheet adapted to mount said sheet within a vehicle, and a rod formed to have the contour of at least three edge portions and the remaining three corner portions of the sheet molded within edge and corner portions of the sheet for normally maintaining the sheet substantially flat in any position of the sheet.

2. In sun visor construction adapted for universal adjustable mounting within a vehicle, a relatively thin, generally rectangular, visor sheet formed of molded rubber, a bar molded integrally within a portion of the upper edge of the sheet having an end portion projecting from one corner of said sheet adapted to mount said sheet within a vehicle, and a metal rod connected to said bar and formed to have the contour of at least three edge portions and the remaining three corner portions of the sheet molded within edge and corner portions of the sheet for normally maintaining the sheet substantially flat in any position of said sheet.

3. In sun visor construction adapted for universal adjustable mounting within a vehicle, a relatively thin, generally rectangular, visor sheet formed of molded rubber, a bar molded integrally within a portion of the upper edge of the sheet having an end portion projecting from one corner of said sheet adapted to mount said sheet within a vehicle, a rod connected to said bar and formed therewith to have the generally rectangular contour of the edge and remaining three corner portions of the sheet molded within the edge and remaining three corner portions of the sheet for normally maintaining the sheet substantially flat in any position of said sheet, said sheet having such pliability, flexibility and resilience as to collapse readily upon being struck by force, and said rod having insufficient strength or stiffness to prevent collapse of the rubber sheet upon being struck by force.

ROBERT F. SIMPSON.
EARL H. SCHONER.

REFERENCES CITED

The following references are of record in the file of this patent:

UNITED STATES PATENTS

| Number | Name | Date |
| --- | --- | --- |
| 1,498,155 | Dorr | June 17, 1924 |
| 2,207,668 | Hudgings | July 9, 1940 |
| 2,193,469 | Ashton | Mar. 12, 1940 |

FOREIGN PATENTS

| Number | Country | Date |
| --- | --- | --- |
| 316,165 | Great Britain | July 23, 1929 |